United States Patent [19]
Harwood

[11] 3,864,053
[45] Feb. 4, 1975

[54] PORTABLE GUIDE JIG FOR HAND DRILL

[76] Inventor: William James Harwood, Apt. 6, 4973 Fontaine, Saginaw, Mich. 48603

[22] Filed: July 19, 1973

[21] Appl. No.: 380,913

Related U.S. Application Data

[63] Continuation-in-part of Ser. No. 328,561, Feb. 1, 1973, Pat. No. 3,809,489.

[52] U.S. Cl. ............... 408/110, 408/115, 33/174 S, 33/185 R
[51] Int. Cl. ............................................ B23b 49/00
[58] Field of Search ........... 408/110, 111, 112, 115, 408/72, 99, 234; 33/174 S, 185 R

[56] References Cited
UNITED STATES PATENTS

| | | | |
|---|---|---|---|
| 2,802,380 | 8/1957 | Fossheim | 408/234 X |
| 3,119,286 | 1/1964 | Forman et al. | 408/110 |

*Primary Examiner*—Gil Weidenfeld
*Attorney, Agent, or Firm*—N. Jerome Rudy

[57] ABSTRACT

A universal portable jig adapted to be hand held and to hold and support a portable electric drill at an adjustable predetermined angle relative to a surface to be penetrated by the bit of said drill which comprises: first and second substantially trough-shaped main support members each having open ends, the second support member being nested in the first support member and pivotally supported thereby; pivoted adjustment being possible by virtue of the floor of first support member being foreshortened adjacent the pivotal axis; means for locking the first and second support members in predetermined pivotal angle relationship; and means for mounting the drill within and to the second support member, said mounting means being slideable longitudinally of the support member whereby the drill is advanceable towards an end of the jig to allow the bit to be operatively extended.

12 Claims, 11 Drawing Figures

PORTABLE GUIDE JIG FOR HAND DRILL

BACKGROUND OF THE INVENTION:

A. PRIOR APPLICATION:

This Application is a Continuation-In-Part of the, identically-entitled Application (by the same inventor) for U.S. Letters Patent having the Ser. No. 328,561, which was filed Feb. 1, 1973, now U.S. Pat. No. 3,809,489 issued May 7, 1974.

B. FIELD OF THE INVENTION:

The present invention relates to a portable device (with many advantageous features therein) for steadying and guiding a portable electric drill of most any brand or style and type and dimensions during use of the drill to make holes into a surface at a predetermined angle in the range of 90° or so to less than about 45°.

(C). DESCRIPTION OF THE PRIOR ART:

Numerous devices are found in the prior art which each individually and severally are in the nature of a drill press utilizing a portable electric drill fastened to rather sturdy apparatus which, quite generally, is too heavy to be readily held by hand. Other devices which are portable suffer from the need for an unusually long bit to reach the workpiece or are so designed as to require differently spaced guide bars for each size or make of drill.

OBJECTS OF THE INVENTION:

It is a principal object of the invention to provide a portable jig for holding and guiding a portable electric drill during the drilling of holes in a surface at a predetermined angle in the range of about 90° to about 45° or less, which device is actually and truly light enough to be: readily hand held; readily adjusted as to angle of approach to the surface; and universal as to adaptability to hold and guide most any make and size of portable drill; and, further and in addition, relatively inexpensive to construct and maintain.

SUMMARY OF THE INVENTION:

The apparatus of the invention is a universal portable jig adapted to be hand-held and to hold and support a portable electric drill at an adjustable predetermined angle relative to a surface to be penetrated by the bit of said drill. In basic essence, the apparatus of the present invention comprises: first and second substantially rectangular trough-shaped main support members each having open ends, the second support member being nested in the first support member and pivotally supported thereby fastening members adjacent an end of the jig, and the floor of the first support member being foreshortened at the end of the jig adjacent the fastening members; means for locking the first and second support members in predetermined pivotal angle relationship; and means for mounting a portable electric drill within and to the second support member, said means for mounting being slideable longitudinally of the jig whereby the drill is advanceable towards an end of the jig so as to allow the said bit to be operatively extended.

If desired, an end of the jig from which the drill bit is to extend is provided with mutually outwardly extending flanges adapted to act as a support base for the jig when in use. In another preferred form of the present jig the end of the jig opposite the end from which the jig is normally to extend is provided with handle portions integrally formed with the first trough-shaped support member.

Figure 1:
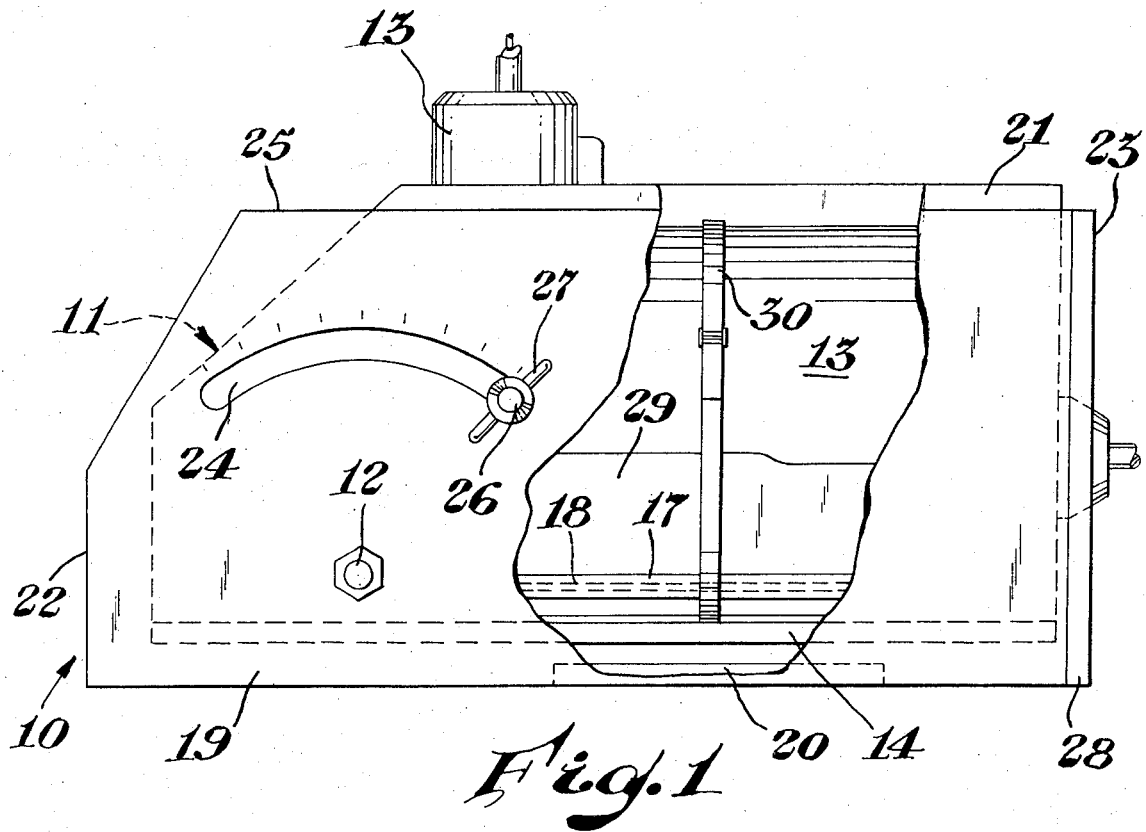
FIG. 1 is a view in side elevation partly broken away and in section which shows the apparatus of the invention with a portable electric drill mounted therein and with the bit thereof extending operatively from an end of the apparatus.
Figure 3:
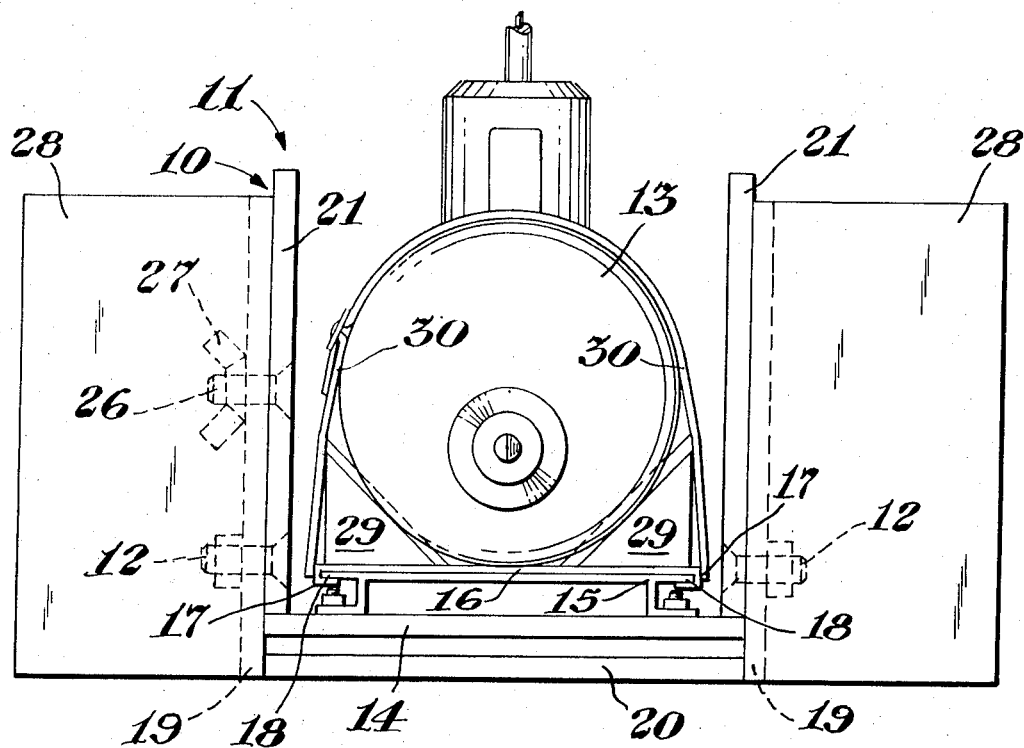
FIG. 3 is an end view of the apparatus showing the end which faces a surface to be penetrated by the bit of the drill.
Figure 4:
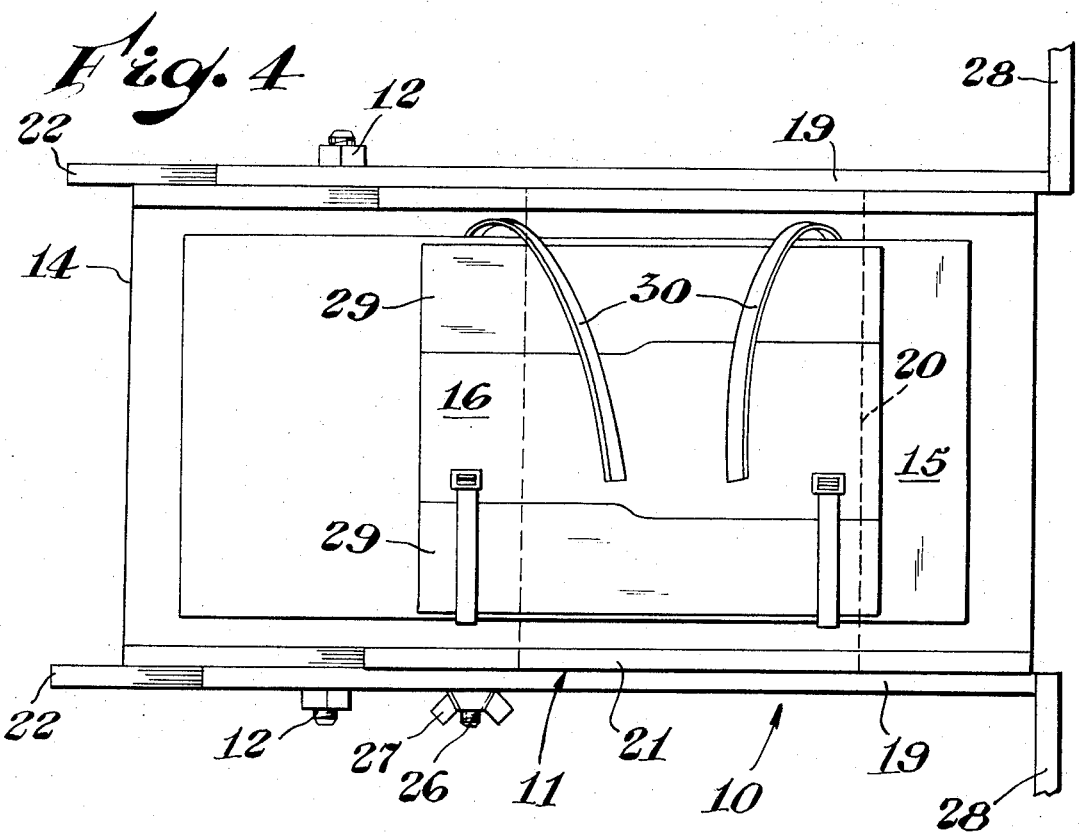
FIG. 4 is a plan view of the apparatus with the drill of FIG. 1 omitted in order to more clearly illustrate the slideable mounting means for the drill.

PARTICULARIZED DESCRIPTION OF THE INVENTION:

Referring first to the embodiment illustrated in FIGS. 1, 3 and 4, the present apparatus is seen to have a first outer trough-shaped support member 10, with open ends; a second trough-shaped support member 11, with open ends which is nested therein and pivotally supported therefrom by means of fastening members 12 located adjacent an end of the jig; and means for mounting an electric drill 13 on the floor 14 of the support member 11, said means being a raised elongated, planar, rectangular track member 15 fixedly attached to the floor 14; and a rectangular planar guide member 16 superposed and slideable on the track member 15 and being held thereto by generally U-shaped flange portions 17 of the guide member 16 which flange portions 17 extends longitudinally along each lateral edge thereof and past and around the corresponding lateral edges 18 of the track member 15.

Support member 10 is of rectangular trough shape, being made up of sidewalls 19 connected by a floor 20. The support member 11 is also of rectangular trough shape, having sidewalls 21 connected by a floor 14 of a width that is more narrow than that of the floor 20 so that the support member 11 slides easily between the sidewalls 19 of the first support member 10 in assembling the apparatus. The second support member 11 is pivotally supported by means of fastening members 12, the axes of which are substantially co-aligned and which each extend rotatably through one sidewall of each support member adjacent an end 22 of the first support member 10. This is adjacent and above the floor 20 thereof, as well as above the floor 14 of the second support member 11. The floor 20 of the first support member 10 is foreshortened at each end 22, 23, extending only from about the vicinity of the fastening members 12 towards the remote end 23 of the first support member 10. This permits pivotal adjustment of the second support member 11.

Figure 2:
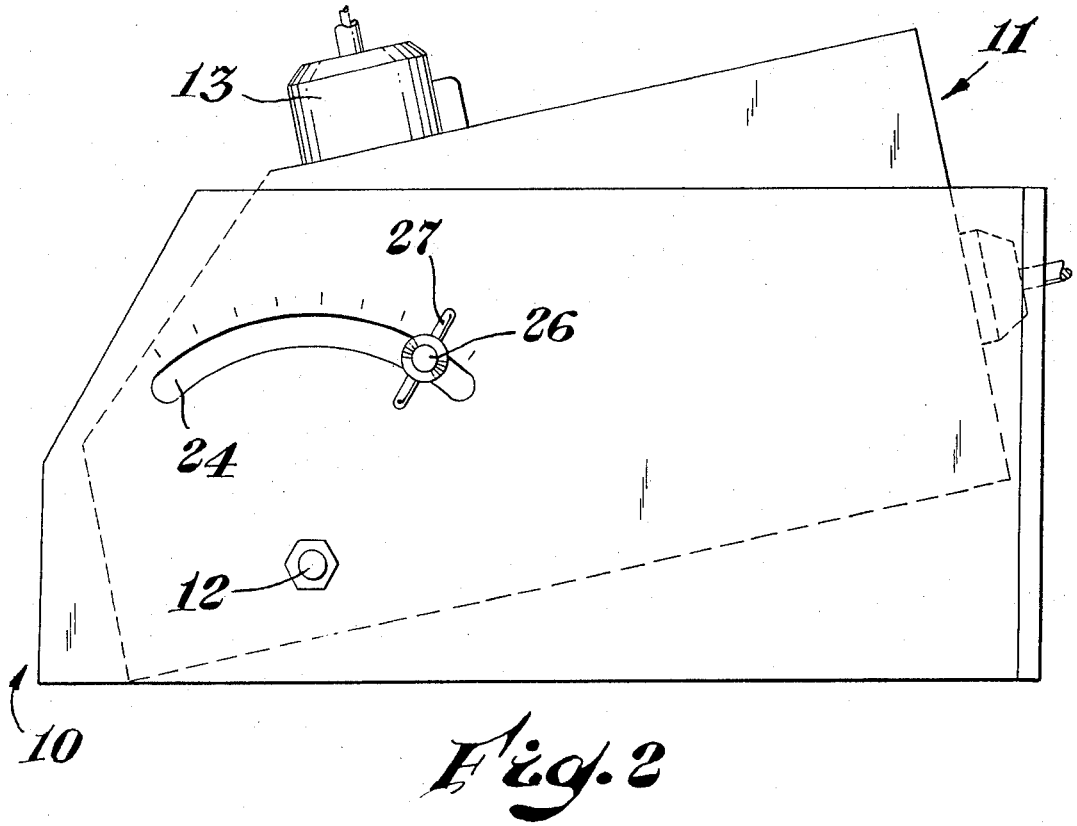
FIG. 2 is a view in side elevation of the same apparatus shown in FIG. 1, but with the inner trough-shaped support member inclined at an angle with respect to the outer support member.

The pivotal movement is adjustable and controlled by means of an arcuate slot 24 which is formed in one of the sidewalls 19 of the first support member 10 above the fastening member 12 and approximately between the fastening member 12 and a free edge 25 of the sidewall remote from the floor 20, and a threaded fastener element 26 affixed in the adjacent sidewall 21 of the second support member 11 and extending through the slot 24. There is a nut element 27, preferably a wing nut, threaded on fastener element 26 and bridging the slot 24. Tightening the nut elements 27 against the sidewall 19 restricts and locks the threaded fastener element 26 against movement along the slot. The slot has a radius of curvature centered at the adjacent fastening member 12 and extends at least along an arc of about 35° from a line drawn perpendicularly from the floor 20 or floor 14 and passing through the axis of the fastening member 12 and angularly forwardly towards the remote end 23 of the first support member 10 (i.e., the remote end of the jig). Generally the arc is also extended somewhat back of the said perpendicular line to afford an even greater amount of angular adjustment for very shallow angles of drilling, such as 30° to 45° though these angles are also feasible, practically, in drilling into softer materials of construction and less often practiced. A comparison of FIGS. 1 and 2 shows the displacement of the threaded fastener element 26 along the slot 24 in pivoting the support member 11 relative to support member 10.

The first support member 10 is provided at end 23 thereof with mutually coplanar, transversely outwardly extending flange portions 28 which act as a support base for the jig and are placed on the surface to be penetrated by the bit of the drill when the jig is in use. These flange portions may be omitted, if desired. However, they do add a desired degree of stability as well as a decreased tendency of the jig to slide across the surface to be penetrated, during the drilling operation.

Referring now particularly to FIGS. 3 and 4, the means for mounting the electric drill 13 is seen to include positioning blocks 29 extending longitudinally along either lateral edge of the guide member 16. These positioning blocks 29 are generally triangular in section and present an inwardly sloping surface at each side of the guide member 16 so as to cradle the electric drill.

In this connection, it should be taken into account that some brands of electric drills have a housing which is smaller closer to the handle grip. Accordingly, the positioning blocks which would otherwise be uniform in cross section are best made larger in section throughout the portion of each block supporting such smaller portion of the drill housing. The difference in size in the different parts of the positioning blocks is thus sufficient to afford leveling of the drill so that the drill bit in the chuck of the drill extends along a line parallel to the plane mounting means along which the drill is slideably carried as it advances during drilling of holes.

Also, as is evident in and may be seen in FIG. 4, the slideable guide member 16 is shorter than the track member 15 so that a useful amount of movement is afforded the guide member 16 as its slides back and forth. The electric drill being utilized may be fastened to the guide member in most any convenient way that holds the drill firmly so that it does not rock or waggle so as to damage the drill bit during drilling. A convenient means of attachment is to use fabric straps or belts 30 as are shown in FIG. 4. These are attached to the guide member 16 or the positioning blocks 29, the straps reaching over the drill motor housing and buckling or otherwise connecting tightly over the drill.

In using the jig of the invention, a conventional electric drill, such as one of the common drills adapted to accept in the chuck thereof a bit having a shank in the range of one-quarter to three-eighths inch diameter, is placed in the inner trough-shaped support member, on the positioning blocks with the handle grip up and the chuck end with the bit facing away from the end of the jig where the fastening members hold the first and second support members together pivotally. The fastening straps are pulled together over the electric drill and secured with the drill positioned so that the bit extends along a line parallel to the plane of the slideable guide member, which is ordinarily parallel to the plane of the floor of the inner or second support member. The wing nut to the fastener element is loosened and the inner support member is pivoted away from the outer of first support member to the extent necessary to provide the desired angle of approach of the drill bit to a surface, for example, the angle depicted in FIG. 2.

Preferably, the edges of the arcuate slot along which the fastener element moves during such adjustment is provided with a calibrated and graduated scale showing the numerical size of the angle between the support members.

In using the drill to make holes, the jig with the electric drill mounted therein is manually placed against the surface to be penetrated with the flange portions firmly flat against the surface, with the associated drill bit being aimed at the point where a hole is desired and the trigger switch or other switch as may be provided on the electric drill is actuated. This then turns on the drill motor. The drill is subsequently and sequentially manually urged toward the surface to be penetrated and is moved along a straight line path as the guide member slides along on the track member until the bit touches the said surface and continued manual pressure urges the turning bit into the surface to the desired depth, whereupon the drill is readily backed off along a straight line without damaging the bit.

In this way and manner, a hole is made which is accurate in location and direction, and without the drill bit deviating from its desired path and without angular variation in the direction of attack of the bit during drilling.

The jig of the invention may if desired be made entirely from wood, such as plywood sheet of, say, about one-quarter inch thickness. However, in such case the fastener element and wing nut, the fastening members, and the mounting means are nonetheless probably better of metal or plastic material.

For greater stability and durability, the jig is preferably made of a light weight metal of construction, such as an alloy of magnesium (such as AZ31) or an alloy of aluminum containing magnesium or silicon as a strengthening addition, the sidewalls and floors and flanges and such in each member being joined, preferably, by welding or soldering or brazing as well understood in the metal working arts. Of course, steel and/or plastic materials can also be utilized as materials of construction for the jig assembly of the present invention.

Figure 5:
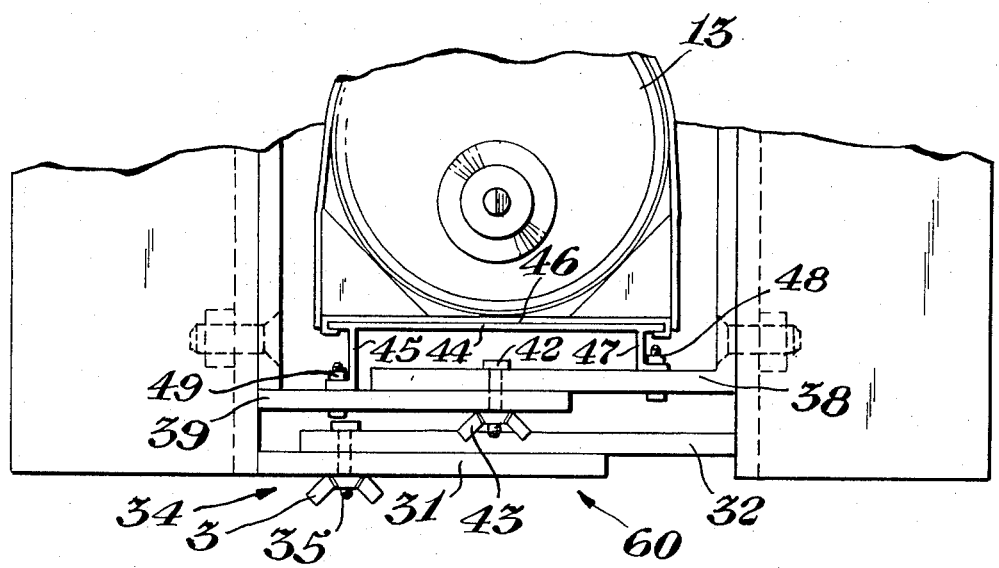
FIG. 5 is a fragmentary portion of a view similar to FIG. 3 showing an embodiment of the present apparatus wherein the floors of both support members are transversely expandable.
Figure 6:
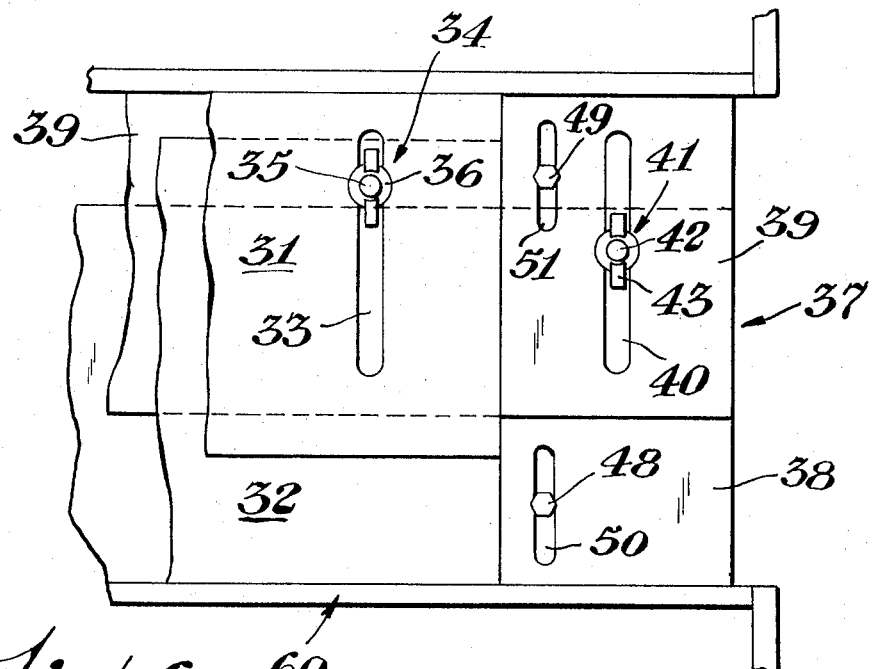
FIG. 6 is a fragmentary view of the underside of the apparatus of FIG. 5 further illustrating the construction of the transversely expandable floors.

In yet another embodiment of the invention, portions of which are shown in FIGS. 5 and 6, the floor 60 of the first support member is provided in the form of two elongated overlapping sheets 31 and 32. Each sheet is provided with at least two transverse slots, 33, each of which is aligned with slots in the mating piece. This is pursuant to structures that are well understood in the art is providing an expandable trough or box. All of it, accordingly, is held together by a fastener 34, such as the bolt 35 and wing nut 36 shown.

Similarly, the floor 36 of the second support member is provided in the form of two elongated overlapping rectangular sheets 38, 39. Each sheet 38, 39 is provided with at least two transverse slots 40 aligned with slots in the other, or mating, sheet, and the sheets held together by a fastener 41 extending through each slot and bridging the same, such as the bolt 42 and wing nut 43 shown. A track member 44 with a wider flange support 45 on one longitudinal side than the other provides a level supporting surface for the guide member 46 on which the electric drill is mounted in this embodiment of the present jig. The flange supports 45, 47 are attached to the respective longitudinally divided floor portions or sheets 38, 39 by fasteners 48, 49 which, when loosened, are slideable in respective transverse slots 50, 51 in the respective sheets 38, 39, thus affording a centering of the mounting means after changing the transverse width of the inner support member.

In another embodiment of the jig of the present invention advantageously constructed of metal and shown particularly in FIGS. 7–11, the first or outer support member 61 having sidewalls 62 is provided with an extended end portion 63 of each sidewall at the end opposite the fastening members 64 and each such extended portion is provided with a hand receiving slot 65 formed therein, the slots extending substantially in a direction perpendicular to the plane of the floor 66 (shown in dotted outline) of such member 61.

If it is desired to use such extended portions 63 as a base for the jig useful in positioning the jig against a planar surface, the end portions 63 are made substantially wider than the remainder of the sidewalls 62, save for the arcuate slot containing portion 67, and the extended portions 63 each terminate at the end 81 along a common plane substantially perpendicular to each of the floor 66 and the extended portions 63 of the sidewalls 62, thereby forming a stable base for the jig. The sidewalls 62 may be more substantially uniform in width from end to end if desired, but weight saving is accomplished by narrowing all other portions except the arcuate slot containing portion 67, and moreover, it is generally easier to mount or remove the electric drill motor 68 if the sidewalls 62 are narrower allowing easier access to the fastening strap 69 without having to entirely remove from the jig the slideable guide member indicated generally by the numeral 70 in FIGS. 8 and 9.

Figure 8:
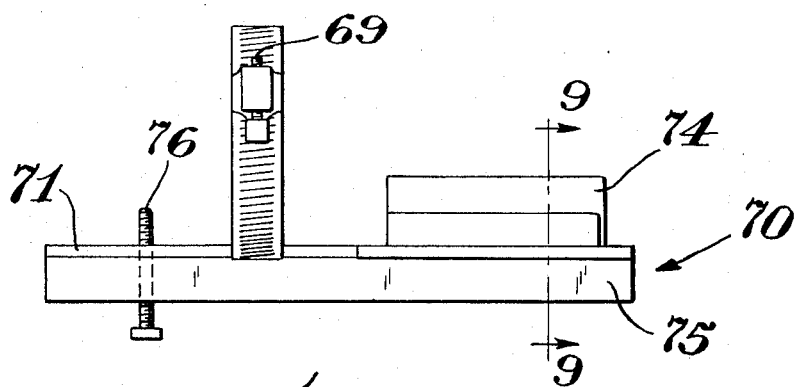
FIG. 8 is a view in side elevation of a slideable guide member for a drill for use in the embodiment shown in FIG. 7.
Figure 9:
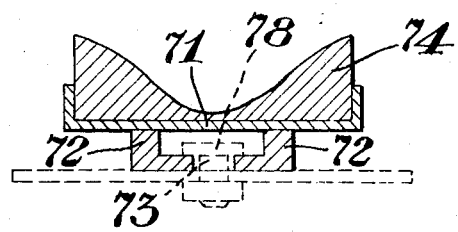
FIG. 9 is a view in section of the slideable guide member of FIG. 8 taken along the line 9—9 thereof.
Figure 10:
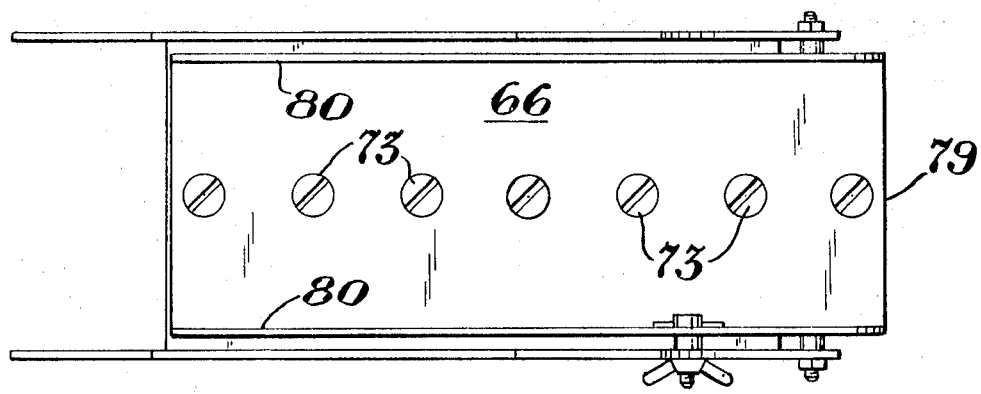
FIG. 10 is a plan view of the jig of FIG. 7 with the drill motor removed.

As may be seen from FIGS. 8, 9 and 10, the guide member 70 is provided with a floor 71 substantially rectangular in shape and having depending mutually opposed parallel flange portions 72 which cooperatively engage track means, such as the element 73 shown in dotted outline in FIG. 9.

The guide member 70 is also provided with an electric drill motor cradling block 74, substantially V-shaped in section, positioned adjacent an end 75 of the guide member, a fastening strap 69 such as a hose clamp located at about mid-length of the guide member and effective to secure the drill motor to the guide member and preferably is provided with adjustable threadable means 76, usually in the form of a small bolt, extending transversely upwardly through the floor 71 and adapted to bear against the drill motor 68 adjacent an end thereof to level it in relationship to the other end of the drill motor resting on the cradling block 74 so that the drill bit 77 moves in the direction of its axis when the drill motor 68 is advanced during hole drilling. Generally the adjustable threadable means 76 takes the form of two bolts each like bolt 76 in FIG. 8 and spaced apart laterally in the floor 71 to cradle the drill motor 68 securely when mounted and strapped on the guide member 70.

The track means on which the guide member 70 slides may be a continuous substantially T-shaped track substantially narrower than that shown in FIGS. 3 and 5, or, it may take the form of a segment track, which, however, effectively gives the guide member substantially the same guidance. Going even further, the segmented or discontinuous track may take the form of a series of foreshortened cylindrical studs each shaped like or similar to the stud 73 shown in dotted outline in FIG. 9, with an enlarged cylindrical or discate head portion 78 spaced apart from the floor 71 of the guide member 70 and adapted to receive the flange portions 72 thereof under the head portion 78 in slideable relation along the serves of each studs mounted in or on the floor 66 of the second support member indicated generally by the numeral 79, and aligned along a longitudinally extending line about midway the sidewalls 80 of the support member 79, as seen in plan view in FIG. 10. FIG. 10 is a top view of the jig of FIG. 7 with the electric drill motor and guide member removed.

Figure 11:
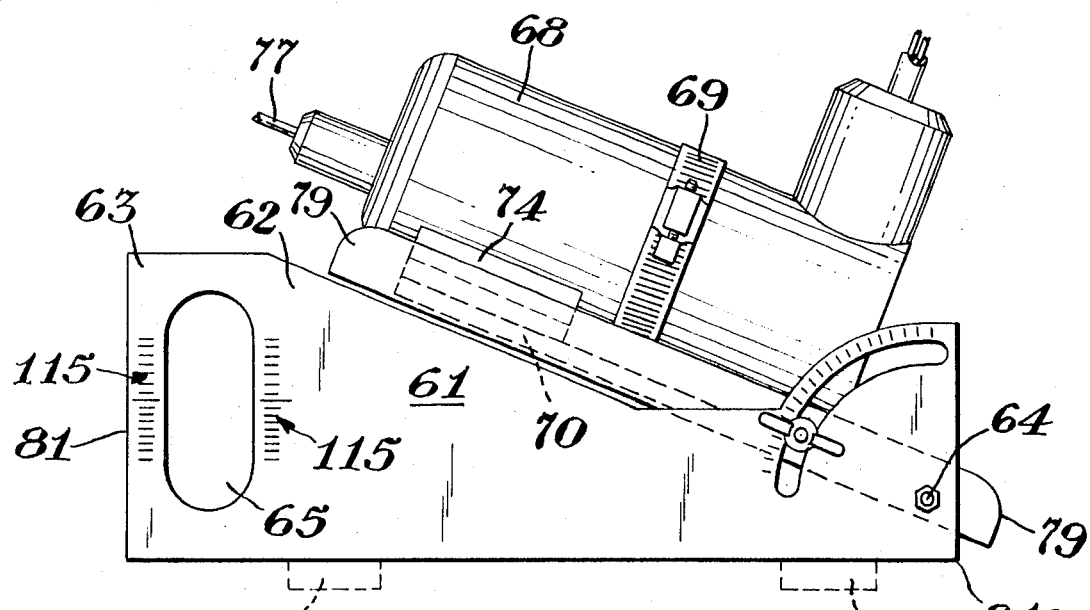
FIG. 11 is a view in side elevation of the jig of FIG. 7 with the drill motor revered 180° and with the inner trough-shaped support member canted upwardly in position for drilling at an angle to a surface parallel to the handlegrip end (and also with certain optional support attachments shown in phantom outline).

On removing the guide member 70 from the jig, neither the track means nor the guide member having retaining means to prevent sliding the guide member 70 clear off the track means, the present jig is readily reassembled with the guide member 70 reversed 180° as is shown in FIG. 11. The jig assembled as there shown with the electric drill motor 68 pointed toward the end oppostie the fastening means 64 and with the second support member 79 canted at an angle to the first support member 61 is ready for hole drilling using extended sidewall end portions 63 as a base, if desired, for resting the jig against a planar workpiece. The foreshortening of the floor 66 of the first, or outer, support member (as shown in dotted outline in FIG. 7) provides a floor only between the fastening means 64 and the end opposite, or at least, up to the extended end portions 63 of the sidewalls 62, and allows the canting or pivoting of the second, or inner, support member 79 without the floors of the respective support members preventing such movement.

Figure 7:
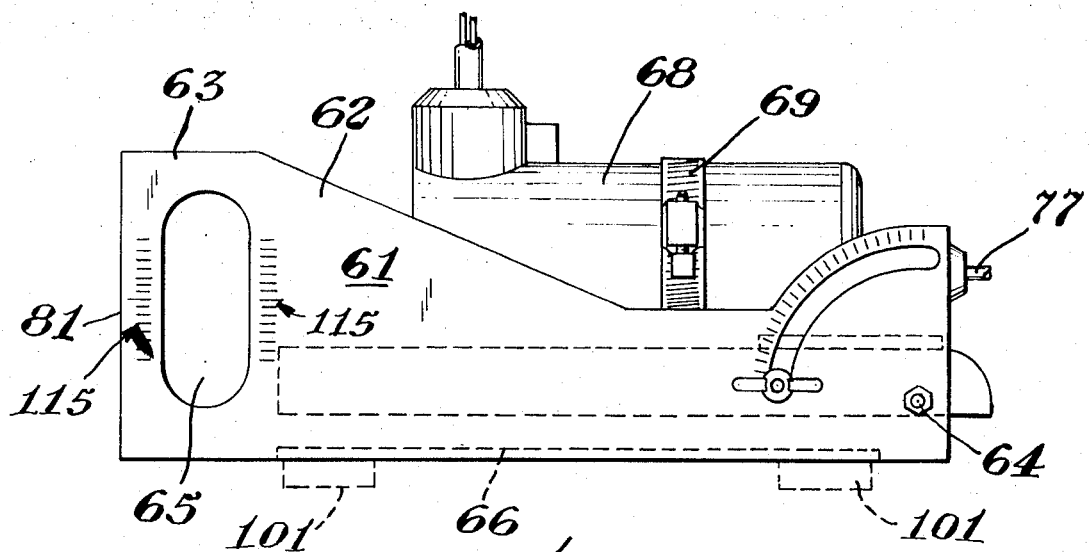
FIG. 7 is a view in side elevation of another embodiment of the jig of the invention made all of metal, and with a drill motor mounted therein.

Advantageously, as is depicted in FIGS. 7 and 11, there may be provided on the sides of the hand receiving slot 65 a set of vernier or calibration markings, designated generally be reference numeral 115, to assist during operation of the apparatus for purposes of making an "eyeball" alignment for 0° or other desired alignment.

Also, as will be readily apparent to those skilled in the art, flanges 28 especially shown in FIGS. 3-6, inclusive, may if desired be disposed so as to extend inwardly towards the center of the jig or even, if preferred, may be provided so as to extend at the same time from each side of the jig both transversely outwardly and inwardly in order to provide the desired support base.

With particular reference to FIG. 11, it can be seen and appreciated that if the second support member 79 is sufficiently extended from the fastening member 64 constituting the pivot therefor, the jig assembly is inherently provided with an "automatic lock possibility" when it is desired to operate the drill in an exact upward 90° direction with respect to the disposition of the support member 61. Thus, by appropriate extension of element 79 it is obvious that, upon pivotal upward turning, the extended part will come against the central bottom of member 61 so as to automatically stop in a 90° position by such movement, the stopping being provided by the portion of member 61 generally designated by reference numeral 81S in FIG. 11. However, when such provisions are made the swing of element 79 before arriving at the 90° stop position may be such that it circumvents the bottom or floor portion or support member 61. To avoid difficulties when such an embodiment and provision is desired, it is practical and desirable to provide at the bottom of the support member 61 legs or blocks or feet, shown in phantom outline and designated by reference numeral 101 in FIG. 11, to allow and accommodate the inner movement of the inner channel from any position of angularity for the drill between 0° and 90°.

If desired, and oftentimes with great advantage, other attachments to or inclusions in the apparatus of the present invention may be provided and utilized. For example, handles, of either a permanently-affixed or detachable nature, or other equivalent holding or grasping attachments can be incorporated in the apparatus at any desired location, such as the back or the side. Analogously, stands or other supporting attachments for the apparatus may also be provided. In addition, varirous jigs or fixtures such as V-jigs and the like, may be incorporated centrally within the apparatus, per se, to steady the drill mounted in the apparatus in the drill's use and operation therewith. Or, alternatively and as permanently fixed or detachable accessories, there may be provided implimentations or clamping or the like fixtures which extend from the base or other suitable apparatus to hold and secure in position during the drilling the piece being worked upon.

Many other and additional changes and modifications can readily be made and adapted in embodiments in accordance with the present invention without substantially departing from its apparent and intended spirit and scope, all in pursuance and accordance with same as is set forth and defined in the hereto appended Claims.

What is claimed is:

1. A portable jig adapted to be hand held and to hold and support a portable electric drill at an adjustable predetermined angle relative to a surface to be penetrated by the bit of said drill, which comprises:
    i. first and second substantially rectangular trough-shaped main support members each having opposed sidewalls connected by a floor, and each having open ends;
    ii. the second support member being nested in the first support member and pivotally supported thereby by first and second fastening members, said fastening members each being adjacent and apart from a common end of the jig;
    iii. and the floor of the first support member being foreshortened at the end of the jig adjacent the fastening members;
    iv. means for locking the first and second support members in predetermined pivotal angle relationship;
    v. and on the floor of said second support member, means for mounting the portable electric drill within and to the second support member, said means for mounting being slideable longitudinally of said floor whereby the drill is advanceable towards an end of the jig so as to allow the said bit to be operatively extended; wherein
    vi. the sidewalls of each of the first and second support members are substantially parallel and aligned;
    vii. the second support member nesting closely inside the first member and being pivotally supported thereby by means of said first and second fastening members each extending through one sidewall of each support member adjacent a common end of the jig but above the floor of the second support member;
    viii. and the fastening members each having an axis of rotation and said axis being substantially co-aligned;
    ix. the floor of the first support member being foreshortened, extending only from the vicinity of the fastening members toward the end of the first support member remote therefrom; thereby
    x. permitting the floor of the second support member to be pivotal through an angle of at least about 45° with respect to the floor of the first support member; wherein
    xi. the ends of the sidewalls of the first support member remote from the fastening members are each provided with mutually coplanar and outwardly extending flange portions adapted to be placed on the surface to be penetrated by said bit and to act as a support base for the jig when in use; and wherein
    xii. the sidewalls of the first support member are each provided with an extended portion at an end thereof; and
    xiii. a hand receiving slot is provided in each extended portion.

2. The jig of claim 1 wherein:
    the means for locking the support members together at a predetermined angle is a threaded fastener element affixed in the sidewall of the second support member and extending therefrom and through an arcuate slot formed through the sidewall of the first support member and adjustably locked thereto by a nut element threaded on the threaded fastener element and bridging said slot, said slot being adjacent a said fastening member extending through the same sidewall and said slot being positioned at least approximately between the fastening member and the free edge of the sidewall furthest from the floor, the radius of curvature of the slot being centered at said fastening member, the said slot extending through an arc of at least about 35° forwardly from a line drawn perpendicularly from the plane of the floor and passing through the axis of the fastening member and extending toward the remote end of the jig, and said threaded fastener element being freely movable along said slot when the nut element is not tightened against the sidewall of the first support member.

3. The jig of claim 2, wherein:
said slot extends through an arc of at least 45° forwardly from said line.

4. The jig of claim 1 wherein:
the floor of each of the support members is compound longitudinally of the jig and adjustably expandable transversely, thereby and therewith to widen the jig to accommodate electric drills of various widths.

5. The jig of claim 1, wherein:
the said mounting means comprises a raised elonged, planar, rectangular track member fixedly mounted on the floor of said second support member, a rectangular planar guide member superposed and slideable on said track member, positioning blocks along the lateral edges of said guide member, and means for fastening the electric drill to said guide member, the guide member being planar, substantially rectangular and foreshortened relative to said track member and being slideably held thereto by a U-shaped flange portion of the guide member extending longitudinally along each lateral edge and past and around the corresponding lateral edges of the track member.

6. The jig of claim 1, wherein:
the sidewalls of the first of said support members are each provided with an extended portion at an end thereof, each extended portion being substantially wider than the rest of the sidewall save for the sidewall having a portion with said arcuate slot therein and each terminating at the end along a common plane substantially perpendicular to the floor of the member and the sidewalls thereby forming a stable base for same jig.

7. The jig of claim 1, wherein:
the slideable means for mounting the portable electric drill motor is a substantially rectangular guide member adapted to slide upon track means, and the guide member is provided with a substantially V-shaped cradling block for the drill motor fastening means for securing the drill motor to the guide member, and the guide member having a floor and adjustable threadable means extending transversely upwardly through the floor and adapted to bear against the drill motor adjacent an end thereof when mounted on said guide member.

8. The jig of claim 7, wherein:
the track means is discontinuous and segmented.

9. The jig of claim 8, wherein:
the discontinuous and segmented track means is a series of foreshortened cylindrical studs attached to the floor of the second support member and aligned along a longitudinally extending line about midway between the sidewalls, each stud being provided with an enlarged cylindrical head portion spaced apart from the floor, the spacings being uniform and adapted to receive the flanges of a flanged guide member slideable along such segmented track means.

10. The jig of claim 7, wherein:
the guide member is readily removable from the jig.

11. The jig of claim 10, wherein:
the guide member is readily removed, reversed 180° in direction and operatively reassembled with the jig.

12. The jig of claim 1, wherein
each slot extends substantially in a direction perpendicular to the plane of the floor of said first support member.

* * * * *